US010519068B2

(12) United States Patent
Ishida et al.

(10) Patent No.: US 10,519,068 B2
(45) Date of Patent: Dec. 31, 2019

(54) CUBIC BORON NITRIDE POLYCRYSTAL, CUTTING TOOL, WEAR-RESISTANT TOOL, GRINDING TOOL, AND METHOD OF PRODUCING CUBIC BORON NITRIDE POLYCRYSTAL

(71) Applicant: Sumitomo Electric Industries, Ltd., Osaka-shi (JP)

(72) Inventors: Yuh Ishida, Itami (JP); Keiko Arimoto, Itami (JP); Katsuko Yamamoto, Itami (JP); Hitoshi Sumiya, Itami (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 95 days.

(21) Appl. No.: 15/549,783

(22) PCT Filed: Jan. 18, 2016

(86) PCT No.: PCT/JP2016/051221
§ 371 (c)(1),
(2) Date: Aug. 9, 2017

(87) PCT Pub. No.: WO2016/129328
PCT Pub. Date: Aug. 18, 2016

(65) Prior Publication Data
US 2018/0029942 A1 Feb. 1, 2018

(30) Foreign Application Priority Data
Feb. 9, 2015 (JP) .................................. 2015-023244

(51) Int. Cl.
*C04B 35/5831* (2006.01)
*B23B 27/14* (2006.01)
*B23B 51/00* (2006.01)
*B23C 5/16* (2006.01)
*B23B 27/20* (2006.01)
*C04B 35/583* (2006.01)
*C04B 35/645* (2006.01)

(52) U.S. Cl.
CPC .......... *C04B 35/5831* (2013.01); *B23B 27/14* (2013.01); *B23B 27/20* (2013.01); *B23B 51/00* (2013.01); *B23C 5/16* (2013.01); *C04B 35/583* (2013.01); *C04B 35/645* (2013.01); *B23B 2226/125* (2013.01); *B23B 2228/00* (2013.01); *C04B 2235/386* (2013.01); *C04B 2235/5445* (2013.01); *C04B 2235/5454* (2013.01); *C04B 2235/781* (2013.01); *C04B 2235/785* (2013.01); *C04B 2235/96* (2013.01)

(58) Field of Classification Search
CPC ................................................. C04B 35/5831
See application file for complete search history.

(56) References Cited

U.S. PATENT DOCUMENTS

| 9,416,304 | B2* | 8/2016 | Ishida | .................. | C09K 3/1418 |
| 2014/0026492 | A1 | 1/2014 | Tatsumi et al. | | |
| 2015/0000207 | A1* | 1/2015 | Ishida | .................. | C09K 3/1418 51/307 |
| 2018/0265416 | A1* | 9/2018 | Ishida | ................. | C04B 35/5831 |

FOREIGN PATENT DOCUMENTS

| EP | 3255023 A1 | 12/2017 | | |
| JP | S47-034099 A | 11/1972 | | |
| JP | S49-27518 | 7/1974 | | |
| JP | S49-027518 A | 7/1974 | | |
| JP | S54-033510 A | 3/1979 | | |
| JP | H03-159964 A | 7/1991 | | |
| JP | H08-47801 A | 2/1996 | | |
| JP | H08-047801 A | 2/1996 | | |
| JP | H08-336705 A | 12/1996 | | |
| JP | H11-246271 A | 9/1999 | | |
| JP | 2007-217281 A | 8/2007 | | |
| JP | 2012-148932 A | 8/2012 | | |
| JP | 2014-034487 A | 2/2014 | | |
| JP | 2014-080322 A | 5/2014 | | |
| JP | 2015202981 A | * | 11/2015 | |
| WO | 2013/031681 A1 | 3/2013 | | |
| WO | WO-2013031681 A1 | * | 3/2013 | ........... C09K 3/1418 |
| WO | 2014161816 A2 | 10/2014 | | |
| WO | WO-2016125548 A1 | * | 8/2016 | ......... C04B 35/5831 |

OTHER PUBLICATIONS

Harano et al., "Cutting performance of binder-Less nano-polycrystalline cBN tool," Advanced Materials Research, ISSN: 1662-8985, vol. 1017, pp. 389-392 [Cited in Communication dated Jun. 25, 2018 in counterpart European Patent Application].
U.S. Appl. No. 15/546,431, filed Jul. 26, 2017.
Dubrovinskaia et al., "Superhard nanocomposite of dense polymorphs of boron nitride: Noncarbon material has reached diamond hardness," Applied Physics Letter 90, 2017, pp. 101912-101912-3 (3 pages) [Cited in Communication dated Jun. 22, 2018 in counterpart European patent application and Cited in U.S. Appl. No. 15/546,431].
Sumiya et al., "Mechanical properties of nano-polycrystalline cBN synthesized by direct conversion sintering under HPHT," Diamond and Related Materials 41, 2014, pp. 14-19 [Cited in Communication dated Jun. 22, 2018 in Counterpart European patent application and Cited in U.S. Appl. No. 15/546,431].
Restriction Requirement dated Nov. 9, 2018 in the co-pending U.S. Appl. No. 15/546,431 (Corresponds to U.S. Pub. No. 20180265416).
Office Action dated Feb. 14, 2019 in the co-pending U.S. Appl. No. 15/546,431 (Corresponds to U.S. Pub. No. 20180265416).

(Continued)

*Primary Examiner* — Karl E Group
(74) *Attorney, Agent, or Firm* — Baker Botts L.L.P.; Michael A. Sartori

(57) ABSTRACT

A cubic boron nitride polycrystal includes cubic boron nitride, the cubic boron nitride having an average grain size of not more than 150 nm, the cubic boron nitride polycrystal having a crack generation load of not less than 25 N in a breaking strength test in which an R200 μm diamond indenter is used to apply a load at a rate of 100 N/min.

8 Claims, No Drawings

(56) References Cited

OTHER PUBLICATIONS

Notice of Allowance dated Jul. 12, 2019 in the co-pending U.S. Appl. No. 15/546,431 (Corresponds to U.S. Pub. No. 20180265416).
Notice of Allowance issued in U.S. Appl. No. 15/546,431, dated Oct. 2. 2019.

* cited by examiner

US 10,519,068 B2

CUBIC BORON NITRIDE POLYCRYSTAL, CUTTING TOOL, WEAR-RESISTANT TOOL, GRINDING TOOL, AND METHOD OF PRODUCING CUBIC BORON NITRIDE POLYCRYSTAL

TECHNICAL FIELD

The present invention relates to a cubic boron nitride polycrystal, a cutting tool, a wear-resistant tool, a grinding tool, and a method of producing the cubic boron nitride polycrystal, in particular, a cubic boron nitride polycrystal, a cutting tool, a wear-resistant tool, a grinding tool, and a method of producing the cubic boron nitride polycrystal, which are useful as cutting tool, wear-resistant tool and grinding tool for an iron-based material.

BACKGROUND ART

Cubic boron nitride (hereinafter, also referred to as "cBN") has hardness second to diamond and is also excellent in thermal stability and chemical stability. Further, cubic boron nitride is more stable with respect to an iron-based material than diamond, so that a cBN sintered material has been used as a working tool for the iron-based material.

However, the cBN sintered material includes about 10 to 40 volume % of a binder, and this binder causes reduction of the strength, heat resistance, and thermal diffusion property of the sintered material. Therefore, particularly when cutting an iron-based material at a high speed, thermal load becomes large and the cutting edge is likely to be chipped and cracked, resulting in a short life of the tool.

As a method of solving this problem, there is a method of producing a cBN sintered material using a catalyst without using a binder. In this method, reaction sintering is performed using hexagonal boron nitride (hBN) as a raw material and using magnesium boron nitride ($Mg_3BN_3$) or the like as a catalyst. The cBN sintered material obtained by this method does not include a binder, so that cBN grains are bonded to each other strongly and thermal conductivity becomes high. Therefore, the cBN sintered material is used for a heat sink material, a TAB (Tape Automated Bonding) bonding tool, or the like. However, because a small amount of the catalyst remains in the sintered material, a fine crack is likely to be caused under application of heat due to a difference in thermal expansion between the catalyst and the cBN and the cBN sintered material is therefore not suitable for a cutting tool. Moreover, because the grain size is large, specifically, about 10 µm, the thermal conductivity is high but the strength is weak and the cBN sintered material is therefore incapable of applications for cutting involving a large load or the like.

On the other hand, a cBN sintered material can be also obtained by directly converting normal pressure type BN (boron nitride) such as hBN into cBN without using a catalyst under ultra-high pressure and high temperature and by sintering it at the same time (direct conversion sintering method). For example, each of Japanese Patent Laying-Open No. 47-034099 (Patent Document 1) and Japanese Patent Laying-Open No. 03-159964 (Patent Document 2) describes a method of converting hBN into cBN under ultra-high pressure and high temperature so as to obtain a cBN sintered material. Moreover, there is a method of obtaining a cBN sintered material using pyrolytic boron nitride (pBN) as a raw material. This type of method is illustrated in, for example, in Japanese Patent Laying-Open No. 54-033510 (Patent Document 3) or Japanese Patent Laying-Open No. 08-047801 (Patent Document 4). In this method, conditions such as 7 GPa and not less than 2100° C. are required.

Each of Japanese Examined Patent Publication No. 49-027518 (Patent Document 5) and Japanese Patent Laying-Open No. 11-246271 (Patent Document 6) describes a method of obtaining a cBN sintered material under conditions less strict than the above-described conditions.

CITATION LIST

Patent Document

PTD 1: Japanese Patent Laying-Open No. 47-034099
PTD 2: Japanese Patent Laying-Open No. 03-159964
PTD 3: Japanese Patent Laying-Open No. 54-033510
PTD 4: Japanese Patent Laying-Open No. 08-047801
PTD 5: Japanese Examined Patent Publication No. 49-027518
PTD 6: Japanese Patent Laying-Open No. 11-246271

SUMMARY OF INVENTION

Technical Problem

Patent Document 5 discloses a method of obtaining a cBN sintered material under conditions such as a pressure of 6 GPa and 1100° C. In this method, the grains of hBN, which is a raw material, are of not more than 3 µm, so that the hBN includes several mass % of boron oxide impurity and adsorption gas. Accordingly, sintering insufficiently proceeds due to influence of the impurity and adsorption gas, and hardness, strength, and heat resistance become low due to the inclusion of oxide, with the result that the cBN sintered material cannot be used as a cutting tool, a wear-resistant tool, and the like.

In order to solve the problem, Patent Document 6 discloses a synthesis method performed using a low crystalline hexagonal boron nitride as a raw material under conditions of 6 to 7 GPa and 1550 to 2100° C. Moreover, it is disclosed that the cBN polycrystal synthesized by this method has a crystal grain size of about 0.1 to 1 µm.

However, when the sintering temperature is made low in order to obtain a cBN polycrystal having a small grain size useful for finish machining, precision processing, and the like, sinterability becomes low, which leads to low strength of the polycrystal. Furthermore, a small grain size leads to low toughness, with the result that a tool is readily chipped, disadvantageously.

In view of the above problem, it is an object to provide a tough cubic boron nitride polycrystal having a small grain size.

Solution to Problem

A cubic boron nitride polycrystal according to one embodiment of the present invention includes cubic boron nitride, the cubic boron nitride having an average grain size of not more than 150 nm, the cubic boron nitride polycrystal having a crack generation load of not less than 25 N in a breaking strength test in which an R200 µm diamond indenter is used to apply a load at a rate of 100 N/min.

Further, a method of producing a cubic boron nitride polycrystal according to one embodiment of the present invention includes:

preparing, as a starting material, hexagonal boron nitride powder having a grain size of not more than 0.5 µm; and converting the hexagonal boron nitride powder into cubic boron nitride and wurtzite type boron nitride and sintering the cubic boron nitride and the wurtzite type boron nitride under temperature and pressure satisfying the following conditions:

$$P \geq -7.68 \times 10^{-9} T^3 + 5.3003 \times 10^{-5} T^2 - 0.1224T + 102.23,$$

$$T \leq 2200, \text{ and}$$

$$P \leq 25$$

where the pressure is represented by P (GPa) and the temperature is represented by T (° C.).

Advantageous Effects of Invention

According to the description above, the cubic boron nitride polycrystal includes cubic boron nitride having a fine grain size and is a tough polycrystal.

DESCRIPTION OF EMBODIMENTS

[Description of Embodiments of the Present Invention]

First, embodiments of the present invention are listed and described.

As a result of diligent study to solve the above-described problem, the present inventors have found that a tough cubic boron nitride polycrystal having a fine structure can be obtained by converting hexagonal boron nitride powder having a grain size of not more than 0.5 µm into cubic boron nitride under high pressure and high temperature.

[1] Specifically, a cubic boron nitride polycrystal according to one embodiment of the present invention includes cubic boron nitride, the cubic boron nitride having an average grain size of not more than 150 nm, the cubic boron nitride polycrystal having a crack generation load of not less than 25 N in a breaking strength test in which an R200 µm diamond indenter is used to apply a load at a rate of 100 N/min. This cubic boron nitride polycrystal includes cubic boron nitride having a fine grain size and is a tough polycrystal.

[2] The cubic boron nitride preferably has an average grain size of not more than 100 nm. By further decreasing the average grain size in this way, the cubic boron nitride polycrystal becomes more suitable for applications requiring a small grain size.

[3] The cubic boron nitride polycrystal preferably includes not less than 0.01 volume % of wurtzite type boron nitride. Accordingly, the structure of the polycrystal will become more dense.

[4] The cubic boron nitride polycrystal preferably includes 0.01 to 0.5 volume % of compressed hexagonal boron nitride. Accordingly, crack can be prevented from being developed and toughness can be improved.

[5] For X-ray diffraction in the cubic boron nitride, a ratio $I_{(220)}/I_{(111)}$ of X-ray diffraction intensity $I_{(220)}$ at a (220) plane to X-ray diffraction intensity $I_{(111)}$ at a (111) plane is preferably not less than 0.1 and not more than 0.3. Accordingly, the polycrystal becomes isotropic, whereby uneven wear is reduced when applied as a tool or the like.

[6] A cutting tool according to one embodiment of the present invention includes the cubic boron nitride polycrystal described above. This cutting tool is useful to cut an iron-based material.

[7] A wear-resistant tool according to one embodiment of the present invention includes the cubic boron nitride polycrystal described above. This wear-resistant tool is useful to process an iron-based material.

[8] A grinding tool according to one embodiment of the present invention includes the cubic boron nitride polycrystal described above. This grinding tool is useful to grind an iron-based material.

[9] A method of producing a cubic boron nitride polycrystal according to one embodiment of the present invention includes:

preparing, as a starting material, hexagonal boron nitride powder having a grain size of not more than 0.5 µm; and converting the hexagonal boron nitride powder into cubic boron nitride and wurtzite type boron nitride and sintering the cubic boron nitride and the wurtzite type boron nitride under temperature and pressure satisfying the following conditions:

$$P \geq -7.68 \times 10^{-9} T^3 + 5.3003 \times 10^{-5} T^2 - 0.1224T + 102.23,$$

$$T \leq 2200, \text{ and}$$

$$P \leq 25$$

where the pressure is represented by P (GPa) and the temperature is represented by T (° C.). The cubic boron nitride polycrystal obtained by this production method includes cubic boron nitride having a fine grain size and is a tough polycrystal.

[Details of Embodiments of the Present Invention]

The following describes an embodiment (hereinafter, referred to as "present embodiment") of the present invention more in detail.

<Cubic Boron Nitride Polycrystal>

A cubic boron nitride polycrystal according to the present embodiment includes cubic boron nitride, and the cubic boron nitride has an average grain size of not more than 150 nm. Moreover, the cubic boron nitride polycrystal has a crack generation load of not less than 25 N in a breaking strength test in which an R200 µm diamond indenter is used to apply a load at a rate of 100 N/min.

Thus, the cubic boron nitride polycrystal according to the present embodiment includes cubic boron nitride. As long as cubic boron nitride is included, an inevitable impurity may be included to such an extent that the effect of the present embodiment is exhibited. Examples of the inevitable impurity include nitrogen ($N_2$), hydrogen ($H_2$), oxygen ($O_2$), and the like. The polycrystal does not substantially include a binder, a sintering additive, a catalyst, and the like, which is one of advantages of the cubic boron nitride polycrystal of the present embodiment. This is because disadvantages can be overcome which result from inclusion of binder, sintering additive, and catalyst as in a conventional cubic boron nitride sintered material.

Moreover, the cubic boron nitride polycrystal preferably contains not more than 0.1 volume % of normal pressure type boron nitride. This is because when more than 0.1 volume % of normal pressure type boron nitride is contained, strength may be decreased significantly.

It should be noted that the cubic boron nitride polycrystal is a sintered material, but, in many cases, the term "sintered material" usually implies that a binder is included, so that the term "polycrystal" is used in the present embodiment.

<Cubic Boron Nitride>

The cubic boron nitride included in the cubic boron nitride polycrystal of the present embodiment has a small grain size, preferably has an average grain size of not more than 150 nm, and more preferably has an average grain size of not more than 100 nm. Moreover, a smaller average grain size is more preferable and the lower limit thereof therefore does not need to be limited; however, for production, the lower limit thereof is 10 nm.

The grain sizes in such cubic boron nitride are preferably uniform to attain no stress concentration and high strength, so that the average grain size herein preferably represents a normal distribution. When grains having large and small grain sizes are included, stress is concentrated thereon and strength accordingly becomes low, so that the average grain size preferably represents a normal distribution and is preferably uniform. It should be noted that, in the present application, the expression "grain size of cubic boron nitride" represents the grain size of a crystal grain of cubic boron nitride of the cubic boron nitride polycrystal.

The average grain size can be found by an intercept method employing a scanning electron microscope. Specifically, a scanning electron microscope (SEM) is first used to observe the cubic boron nitride polycrystal at a magnification of ×1000 to ×100000 so as to obtain an SEM image.

Next, a circle is drawn on the SEM image and then eight straight lines are drawn from the center of the circle to the outer circumference of the circle in a radial manner (in such a manner that intersecting angles between the straight lines become substantially equal to one another). In this case, the observation magnification and the diameter of the circle are preferably set such that the number of cubic boron nitride grains (crystal grains) on each straight line becomes about 10 to 50.

Then, the number of crystal grain boundaries of the cubic boron nitride crossed by each of the straight lines is counted, then, the length of the straight line is divided by the number thereof to find an average intercept length, then, the average intercept length is multiplied by 1.128, and the resulting value is regarded as the average grain size (this method is in compliance with a method of calculating a nominal grain size in the ASTM Standards). It should be noted that more preferably, such an average grain size is suitably obtained in the following manner: an average grain size is found for each of several SEM images through the above-described method, and the average value of the average grain sizes is regarded as the average grain size. It should be also noted that in the measurement by the above-described method, the grain size of a grain (such as a crystal grain of wurtzite type boron nitride) other than the cubic boron nitride may be included; however, the measured value is regarded as the average grain size of the cubic boron nitride even though the grain size of the other grain is included.

Because the cubic boron nitride included in the cubic boron nitride polycrystal of the present embodiment has such a small grain size, it can be employed for a wide range of applications such as an application involving a large load and a micro-processing application when used for a tool or the like.

<Wurtzite Type Boron Nitride>

The cubic boron nitride polycrystal of the present embodiment may include wurtzite type boron nitride (wBN), and preferably includes not less than 0.01 volume % of such wurtzite type boron nitride. Accordingly, the structure of the polycrystal will become more dense. It should be noted that in view of characteristics of the wurtzite type boron nitride, the upper limit of the content of the wurtzite type boron nitride is not more than 70 volume %. Existence of the wurtzite type boron nitride provides an effect of hindering development of cracks and improving toughness, but the wurtzite type boron nitride is a metastable phase during transition from hexagonal boron nitride to cubic boron nitride and therefore has characteristics such that stability is inferior to that of cubic boron nitride and wear resistance is low. A more preferable range of the content of the wurtzite type boron nitride is 0.01 to 20 volume %.

When the cubic boron nitride polycrystal includes the wurtzite type boron nitride, the cubic boron nitride polycrystal is configured such that a plurality of crystal grains of the cubic boron nitride and a plurality of crystal grains of the wurtzite type boron nitride are distributed to each other. Moreover, the crystal grains of the cubic boron nitride are bonded to one another firmly, the crystal grains of the wurtzite type boron nitride are bonded to one another firmly, and the crystal grains of the cubic boron nitride and wurtzite type boron nitride are bonded to one another firmly, thereby attaining a dense structure.

It should be noted that in the cubic boron nitride polycrystal containing not less than 0.01 volume % of the wurtzite type boron nitride with the remainder being composed of the cubic boron nitride and an inevitable impurity, the cubic boron nitride has an average grain size of about 20 nm to 72 nm and the crack generation load in the below-described breaking strength test is not less than 33N.

<Compressed Hexagonal Boron Nitride>

The cubic boron nitride polycrystal of the present embodiment may include compressed hexagonal boron nitride, and preferably includes 0.01 to 0.5 volume % of such compressed hexagonal boron nitride. This can provide a function of hindering development of cracks and improving toughness. Moreover, because the existence of the compressed hBN is permitted, sintering can be achieved in a wide temperature range, thus leading to improved productivity. However, if more than 0.5 volume % of the compressed hBN is included, stress concentration in the compressed hBN may become large to decrease the strength. Therefore, when the cubic boron nitride polycrystal further includes the compressed hBN, the upper limit thereof is 0.5 volume %. The volume content of the compressed hBN is more preferably not less than 0.01 volume % and not more than 0.1 volume %, and is particularly preferably not less than 0.05 volume % and not more than 0.1 volume %.

<Breaking Strength Test>

The cubic boron nitride polycrystal of the present embodiment is required to have a crack generation load of not less than 25 N in a breaking strength test in which an R200 μm diamond indenter is used to apply a load at a rate of 100 N/min. This breaking strength test is performed as follows.

First, the R200 μm diamond indenter is prepared. The term "R200 μm diamond indenter" refers to a diamond indenter having a tip shape with a curvature radius of 200 μm. As long as this condition is satisfied, any diamond indenter can be used without a particular limitation.

Next, this diamond indenter is brought into abutment with a surface of the cubic boron nitride polycrystal, and is used to apply a load to the cubic boron nitride polycrystal at a rate of 100 N/min. Then, a load at the moment of generation of a crack in the cubic boron nitride polycrystal is measured, and is regarded as the crack generation load. It should be noted that the moment of generation of a crack can be detected using an AE (acoustic emission) sensor.

It is indicated that strength is higher as this crack generation load is larger. Hence, the crack generation load is more preferably not less than 30 N, and is further preferably not less than 40 N. It should be noted that since a larger crack generation load is more preferable, the upper limit thereof is not particularly limited. However, if the crack is not generated even under application of a load of not less than 200 N, the diamond indenter itself may be plastically deformed.

Hence, the upper limit value (limiting value) of the crack generation load in this test (measurement method) is 200 N.

When this crack generation load is less than 25 N, chipping tends to occur readily during cutting or the like. Hence, such a cubic boron nitride polycrystal is not suitable for applications such as cutting.

It should be noted that when the above-described curvature radius is smaller than R200 μm, the sample (cubic boron nitride polycrystal) is plastically deformed before generation of a crack, with the result that the strength against cracks cannot be measured precisely. Moreover, although the measurement can be performed using an indenter having a larger curvature radius than R200 μm, a larger load is needed to cause generation of a crack. Hence, in the breaking strength test for the cubic boron nitride polycrystal of the present embodiment, the R200 μm indenter is used.

Moreover, the breaking strength test of the present embodiment is preferably performed under a temperature condition of 23° C.±5° C. This temperature substantially corresponds to a room temperature, and is employed because a change in strength of the sample due to a temperature is eliminated and measurement variation is suppressed. Moreover, although the rate of applying the load is set at 100 N/min as described above, a rate smaller than this may be employed. However, application of a load at a rate of more than 100 N/min is not preferable because a measurement value is more likely to be varied.

<X-Ray Diffraction>

For X-ray diffraction in the cubic boron nitride included in the cubic boron nitride polycrystal of the present embodiment, a ratio $I_{(220)}/I_{(111)}$ of X-ray diffraction intensity $I_{(220)}$ at a (220) plane to X-ray diffraction intensity $I_{(111)}$ at a (111) plane is preferably not less than 0.1 and not more than 0.3. Accordingly, the polycrystal becomes isotropic, whereby uneven wear is reduced when applied as a tool or the like.

When the ratio $I_{(220)}/I_{(111)}$ falls out of the above-described range, orientation is achieved in the polycrystal, resulting in anisotropy in the polycrystal. In this case, there is distribution in strength in the polycrystal, thus providing a surface having high strength and a surface having weak strength. Therefore, it is inappropriate to use the polycrystal for a tool. Particularly, in the case of a rotation tool such as an end mill, the surfaces thereof are divided into a surface that is readily worn or is readily chipped and a surface that is unlikely worn or is unlikely chipped, thus resulting in uneven wear. In order to overcome such a shortcoming, it is preferable to achieve isotropy in the polycrystal.

The ratio $I_{(220)}/I_{(111)}$ is more preferably not less than 0.15 and not more than 0.25.

<Application>

Because the cubic boron nitride polycrystal of the present embodiment includes cubic boron nitride (crystal grain) having a fine grain size and is tough, it is suitable to use the cubic boron nitride polycrystal for a cutting tool, a wear-resistant tool, a grinding tool, or the like. In other words, each of the cutting tool, wear-resistant tool, and grinding tool of the present embodiment is provided with the above-described cubic boron nitride polycrystal.

It should be noted that each of the tools may be entirely constituted of the cubic boron nitride polycrystal, or only a portion thereof (for example, an edge portion in the case of the cutting tool) may be constituted of the cubic boron nitride polycrystal. Moreover, a coating film may be formed on a surface of each of the tools.

Here, examples of the cutting tool include a drill, an end mill, an indexable cutting insert for drill, an indexable cutting insert for end mill, an indexable cutting insert for milling, an indexable cutting insert for turning, a metal saw, a gear cutting tool, a reamer, a tap, a cutting bite, and the like.

Further, examples of the wear-resistant tool include a die, a scriber, a scribing wheel, a dresser, and the like.

Further, examples of the grinding tool include a grinding stone and the like.

<Production Method>

A method of producing the cubic boron nitride polycrystal according to the present embodiment includes:

a step (hereinafter, also referred to as "preparing step") of preparing, as a starting material, hexagonal boron nitride powder having a grain size of not more than 0.5 μm; and a step (hereinafter, also referred to as "sintering step") of converting the hexagonal boron nitride powder into cubic boron nitride and wurtzite type boron nitride and sintering the cubic boron nitride and the wurtzite type boron nitride under temperature and pressure satisfying the following conditions:

$$P \geq -7.68 \times 10^{-9} T^3 + 5.3003 \times 10^{-5} T^2 - 0.1224T + 102.23,$$

$$T \leq 2200, \text{ and}$$

$$P \leq 25,$$

where the pressure is represented by P (GPa) and the temperature is represented by T (° C.).

With the above production method, the cubic boron nitride polycrystal described above can be produced. Specifically, the cubic boron nitride polycrystal obtained by this production method includes cubic boron nitride having a fine grain size (i.e., an average grain size of not more than 150 nm) and is a tough polycrystal (namely, with a crack generation load of not less than 25 N in the breaking strength test).

In the preparing step, the grain size of the hexagonal boron nitride powder, which is employed as a starting material, may have a slightly larger grain size than the average grain size of the cubic boron nitride of the cubic boron nitride polycrystal to be obtained. This is because during transition from the hexagonal boron nitride to the cubic boron nitride, binding between atoms in the hBN is disconnected and the atoms are rearranged and recombined, with the result that the grain size of the cubic boron nitride becomes smaller than the grain size of the raw material. However, when the grain size of the raw material is small, there occur a large number of grain boundaries having no intrinsic binding between the atoms in the hBN, with the result that the grain size of the cubic boron nitride after the conversion becomes small. Conversely, when the grain size of the raw material is large, the grain size of the cubic boron nitride becomes large. Therefore, the grain size of the hexagonal boron nitride powder is set at not more than 0.5 μm and the lower limit value thereof is 0.05 μm for the sake of production. A more preferable grain size is not less than 0.1 μm and not more than 0.5 μm.

It should be noted that the grain size of the hexagonal boron nitride powder refers to an average grain size measured by a laser diffraction scattering method employing laser light.

As long as the above-described hexagonal boron nitride powder is prepared, such a preparing step is not limited in terms of its manner, and can be performed, for example, in such a manner that hexagonal boron nitride powder can be produced by a conventionally known synthesis method or in such a manner that commercially available hexagonal boron nitride powder can be acquired.

Moreover, because problems such as grain growth taking place when the temperature is high and unconverted hBN remaining when the temperature is low lead to decreased strength, pressure P (GPa) and temperature T (° C.) in the above-described sintering step are required to satisfy the following conditions:

$$P \geq -7.68 \times 10^{-9} T^3 + 5.3003 \times 10^{-5} T^2 - 0.1224T + 102.23,$$

$$T \leq 2200, \text{ and}$$

$$P \leq 25.$$

Here, temperature T (° C.) is not particularly limited as long as the cubic boron nitride polycrystal can be obtained at the temperature, and the lower limit value thereof does not need to be defined. More preferably, this temperature T (° C.) is 1300 to 2100° C.

Likewise, pressure P (GPa) is not particularly limited as long as the cubic boron nitride polycrystal can be obtained at the pressure, and the lower limit value thereof does not need to be defined. More preferably, this pressure P (GPa) is 10 to 20 GPa.

When the sintering step employing the temperature and pressure in the respective suitable ranges and satisfying the above-described relational expressions is performed, the crack generation load of the obtained cubic boron nitride polycrystal is not less than 25 N.

It should be noted that the above-described temperature and pressure in the sintering step are applied for 5 to 20 minutes. If it is shorter than 5 minutes, the sintering is insufficient, whereas if it is longer than 20 minutes, there is no difference in sintering state, which is disadvantageous economically. More preferably, they are applied for 10 to 20 minutes.

While such a sintering step is a step of converting the hexagonal boron nitride powder into the cubic boron nitride and the wurtzite type boron nitride and sintering the cubic boron nitride and the wurtzite type boron nitride, the hexagonal boron nitride powder is solely and directly converted into the cubic boron nitride and wurtzite type boron nitride without using a sintering additive and a catalyst and this conversion is normally performed at the same time as the sintering.

The cubic boron nitride polycrystal obtained by the production method includes the cubic boron nitride having a fine grain size, exhibits an elastic behavior, and is therefore a tough polycrystal improved in chipping resistance. Hence, the cubic boron nitride polycrystal can be used suitably for a cutting tool, a wear-resistant tool, a grinding tool, and the like, which are employed for high-speed micro-processing involving a large load.

EXAMPLES

While the present invention will be described in more detail with reference to Examples, the present invention is not limited thereto.

Examples 1 to 7

Each of cubic boron nitride polycrystals according to Examples 1 to 7 was produced by the following method. First, as a starting material, hexagonal boron nitride powder having a grain size of 0.5 μm (indicated as "Fine-Grain hBN Powder" in the column "Starting Material" in Table 1 below) was prepared (preparing step).

Next, the hexagonal boron nitride powder prepared as above was introduced into a capsule made of metal having a high melting point, and was held for 20 minutes in temperature and pressure described in Table 1 (column "Synthesis Condition") using a ultra-high pressure/high-temperature generating device, thereby converting the hexagonal boron nitride powder into cubic boron nitride and wurtzite type boron nitride and sintering them (sintering step). Accordingly, the cubic boron nitride polycrystal was obtained.

It should be noted that the temperature and pressure in Table 1 satisfy the following condition: $P \geq -7.68 \times 10^{-9} T^3 + 5.3003 \times 10^{-5} T^2 - 0.1224T + 102.23$.

Comparative Example 1

A cubic boron nitride polycrystal according to Comparative Example 1 was produced by the following method. First, as a starting material, hexagonal boron nitride powder having a grain size of 0.5 μm (indicated as "Fine-Grain hBN Powder" in the column "Starting Material" in Table 1 below) was prepared (preparing step).

Next, the hexagonal boron nitride powder prepared as above was introduced into a capsule made of metal having a high melting point, and was held for 20 minutes in temperature and pressure described in Table 1 (column "Synthesis Condition") using a ultra-high pressure/high-temperature generating device, thereby converting the hexagonal boron nitride powder into cubic boron nitride and sintering it (sintering step). Accordingly, the cubic boron nitride polycrystal was obtained.

Regarding the above-described conditions, the temperature is 2400° C., which does not satisfy the condition of $T \leq 2200$.

Comparative Example 2

A cubic boron nitride polycrystal according to Comparative Example 2 was produced by the following method. First, as a starting material, hexagonal boron nitride powder having a grain size of 0.5 μm (indicated as "Fine-Grain hBN Powder" in the column "Starting Material" in Table 1 below) was prepared (preparing step).

Next, the hexagonal boron nitride powder prepared as above was introduced into a capsule made of metal having a high melting point, and was held for 20 minutes in temperature and pressure described in Table 1 (column "Synthesis Condition") using an upward/downward pressure-application belt-type high pressure/high-temperature generating device, thereby converting the hexagonal boron nitride powder into cubic boron nitride and wurtzite type boron nitride and sintering them (sintering step). Accordingly, the cubic boron nitride polycrystal was obtained.

It should be noted that the above-described condition does not satisfy the relation "$P \geq -7.68 \times 10^{-9} T^3 + 5.3003 \times 10^{-5} T^2 - 0.1224T + 102.23$", and does not satisfy the relation "ratio $I_{(220)}/I_{(111)}$ of X-ray diffraction intensity $I_{(220)}$ is not less than 0.1 and not more than 0.3".

Comparative Example 3

A cubic boron nitride polycrystal according to Comparative Example 3 was produced by the following method. First, as a starting material, hexagonal boron nitride powder having a grain size of not more than 5 μm (indicated as "Coarse-Grain hBN Powder" in the column "Starting Material" in Table 1 below) was prepared (preparing step).

Next, the hexagonal boron nitride powder prepared as above was introduced into a capsule made of metal having a high melting point, and was held for 20 minutes in temperature and pressure described in Table 1 (column "Synthesis Condition") using a ultra-high pressure/high-temperature generating device, thereby converting the hexagonal boron nitride powder into cubic boron nitride and wurtzite type boron nitride and sintering them (sintering step). Accordingly, the cubic boron nitride polycrystal was obtained.

It should be noted that the above-described condition satisfies the relation "$P \geq -7.68 \times 10^{-9}T^3 + 5.3003 \times 10^{-5}T^2 - 0.1224T + 102.23$" but is different from that in each of the Examples in the following point: the grain size of the starting material is not more than 5 μm, which is a grain size larger than that of the starting material of each of the Examples.

Comparative Example 4

A cubic boron nitride sintered material according to Comparative Example 4 was produced by the following method. First, as a starting material, cubic boron nitride powder having an average grain size of not more than 2 μm and Co-based metal binder powder (indicated as "cBN Powder/Metal Binder Powder" in the column "Starting Material" in Table 1 below) were prepared (preparing step).

Next, the cubic boron nitride powder and Co-based metal binder powder prepared as above were introduced into a capsule made of metal having a high melting point, and were sintered by holding them for 20 minutes using an ultra-high pressure/high-temperature generating device under temperature and pressure described in Table 1 (column "Synthesis Condition") (sintering step). Accordingly, the cubic boron nitride sintered material was obtained.

Regarding the conditions above, the starting material was different from that of each of the Examples.

<Evaluation>

A technique described below was employed to measure composition, X-ray diffraction, grain size, and crack generation load in each of the cubic boron nitride polycrystals of Examples 1 to 7 and Comparative Examples 1 to 3 and the cubic boron nitride sintered material of Comparative Example 4, which had been obtained in the manners described above.

<Composition>

The cubic boron nitride (cBN), compressed hexagonal boron nitride (hBN), and wurtzite type boron nitride (wBN) included in each of the cubic boron nitride polycrystals and the cubic boron nitride sintered material were identified using an X-ray diffraction device. This device had an X-ray radiation source, which was Cu and provided Kα ray having a wavelength of 1.54 Å. The result is shown in the column "Composition" of Table 1.

<X-Ray Diffraction>

For cubic boron nitride included in each of the cubic boron nitride polycrystals and the cubic boron nitride sintered material, the X-ray diffraction device was employed to find a ratio $I_{(220)}/I_{(111)}$ of X-ray diffraction intensity $I_{(220)}$ at a (220) plane to an X-ray diffraction intensity $I_{(111)}$ at a (111) plane. This device had an X-ray radiation source, which was Cu and provided Kα ray having a wavelength of 1.54 Å. The result is shown in the column "XRD $I_{(220)}/I_{(111)}$" of Table 1.

<Grain Size>

An intercept method employing a scanning electron microscope was used to find an average grain size of cubic boron nitride included in each of the cubic boron nitride polycrystals and the cubic boron nitride sintered material.

Specifically, a scanning electron microscope (SEM) was first used to observe each cross section of the cubic boron nitride polycrystals and the cubic boron nitride sintered material so as to obtain an SEM image.

Next, a circle was drawn on the SEM image and then eight straight lines are drawn from the center of the circle to the outer circumference of the circle in a radial manner (in such a manner that intersecting angles between the straight lines become substantially equal to one another). In this case, the observation magnification and the diameter of the circle were set such that the number of cubic boron nitride grains on each straight line became about 10 to 50.

Then, the number of crystal grain boundaries of the cubic boron nitride crossed by each of the straight lines was counted, then, the length of the straight line was divided by the number thereof to find an average intercept length, then, the average intercept length is multiplied by 1.128, and the resulting value was regarded as the average grain size.

It should be noted that the magnification of the SEM image was ×30000. This is because with a magnification equal to or less than this magnification, the number of grains in the circle is increased, it becomes difficult to see grain boundaries, and the number of grain boundaries is wrongly counted, and a plate structure is highly likely to be included when drawing the lines. This is also because with a magnification equal to or more than this, the number of grains in the circle is too small to accurately calculate the average grain size. However, for each of Comparative Examples 1 and 4, the grain size was too large, so that a magnification of ×3000 was employed.

Moreover, three SEM images captured in one sample at separate portions were used for each of the Examples and Comparative Examples, an average grain size was found by the above-described method for each SEM image, and the average value of the three average grain sizes obtained was regarded as an average grain size. The result is shown in the column "Average Grain Size" in Table 1.

<Crack Generation Load>

For each of the cubic boron nitride polycrystals and the cubic boron nitride sintered material, in order to measure the crack generation load, a breaking strength test was performed under the following conditions.

Specifically, an R200 μm diamond indenter was prepared as an indenter, was pressed against each of the samples (each of the cubic boron nitride polycrystals and the cubic boron nitride sintered material) to apply a load thereto at 23° C.±5° C. at a rate of 100 N/min until a crack was generated. A load upon generation of a crack was measured as the crack generation load. This measurement was performed three times. Moreover, as the crack generation load of each sample, the average value of respective three values of the results of measurements performed three times as described above is determined. The result is shown in the column "Crack Generation Load" in Table 1.

TABLE 1

| | Starting Material | Synthesis Condition | | Composition (Volume %) | | | XRD $I_{(220)}/I_{(111)}$ | Average Grain Size (nm) | Crack Generation Load (N) |
|---|---|---|---|---|---|---|---|---|---|
| | | Pressure (GPa) | Temperature (° C.) | cBN | Compressed hBN | wBN | | | |
| Example 1 | Fine-Grain hBN Powder | 25 | 1100 | 38 | 0 | 62 | 0.17 | 20 | 32 |
| Example 2 | Fine-Grain hBN Powder | 20 | 1300 | 45 | 0 | 55 | 0.14 | 30 | 41 |
| Example 3 | Fine-Grain hBN Powder | 15 | 1500 | 91.5 | 0 | 8.5 | 0.29 | 48 | 35 |
| Example 4 | Fine-Grain hBN Powder | 10 | 1700 | 97.5 | 0.1 | 2.4 | 0.15 | 55 | 51 |
| Example 5 | Fine-Grain hBN Powder | 8 | 2200 | 100 | 0 | 0 | 0.20 | 88 | 27 |
| Example 6 | Fine-Grain hBN Powder | 22 | 2100 | 99 | 0 | 1.0 | 0.25 | 72 | 33 |
| Example 7 | Fine-Grain hBN Powder | 16 | 1900 | 99.4 | 0 | 0.6 | 0.17 | 69 | 55 |
| Comparative Example 1 | Fine-Grain hBN Powder | 10 | 2400 | 100 | 0 | 0 | 0.20 | 1240 | 17 |
| Comparative Example 2 | Fine-Grain hBN Powder | 7.5 | 2200 | 98.9 | 1.1 | 0 | 0.03 | 288 | 15 |
| Comparative Example 3 | Coarse-Grain hBN Powder | 10 | 2100 | 98.5 | 0 | 1.5 | 0.21 | 165 | 21 |
| Comparative Example 4 | cBN Powder/Metal Binder Powder | 7 | 1800 | 100 (Excluding Binder) | 0 | 0 | — | 2000 | 10 |

As shown in Table 1, it was confirmed that Examples 1 to 4, 6, and 7 contain 0.6 to 62 volume % of wurtzite type boron nitride (wBN). Moreover, the average grain size of the cubic boron nitride of each of Examples 1 to 7 was 20 to 88 nm. On this occasion, the crack generation loads of Examples 1 to 7 were 27 to 55 N.

On the other hand, the average grain size of the cubic boron nitride of Comparative Example 1 was 1240 nm, which was larger than those of Examples 1 to 7. Moreover, the crack generation load of Comparative Example 1 is 17 N, which is lower than those of Examples 1 to 7. Hence, the strength thereof is apparently low.

Moreover, in Comparative Example 2, ratio $I_{(220)}/I_{(111)}$ is 0.03 in the X-ray diffraction of the cubic boron nitride. Hence, orientation is high to result in non-isotropy. Moreover, the crack generation load of Comparative Example 2 is 15 N, which is lower than those of Examples 1 to 7. Hence, the strength thereof is apparently low.

Moreover, Comparative Example 3, which employed the hexagonal boron nitride powder having a grain size of 5 μm as the raw material, had an average grain size of 165 nm, which was larger than that of each of Examples 1 to 7. On this occasion, the crack generation load is 21 N, which is lower than those of Examples 1 to 7. Hence, the strength thereof is apparently low.

Moreover, for the raw material of Comparative Example 4, the cubic boron nitride powder and the binder are used. The crack generation load thereof is 10 N, which is lower than those of Examples 1 to 7. Hence, the strength thereof is apparently low.

Further, each of the cubic boron nitride polycrystals and cubic boron nitride sintered material of each of the Examples and the Comparative Examples was attached to the tip of a ball end mill tool having a tip diameter of 0.5 mm, and then cutting performance thereof was evaluated. A hardened steel of HRC60 was prepared as a material to be cut, and was cut by 24 m under conditions that a rotating speed was 60000 rpm, a cutting speed was 200 mm/min, a cut-in amount was 5 μm, and a feed amount was 3 μm. A wear amount of the tool upon completion of the cutting is shown as "Tool Wear Relative Ratio" in Table 2.

TABLE 2

| | Tool Wear Relative Ratio |
|---|---|
| Example 1 | 1.4 |
| Example 2 | 1.5 |
| Example 3 | 1.2 |
| Example 4 | 1.1 |
| Example 5 | 1.5 |
| Example 6 | 2.0 |
| Example 7 | 1 |
| Comparative Example 1 | Cutting Edge Greatly Chipped; Processing Discontinued |
| Comparative Example 2 | Cutting Edge Greatly Chipped; Processing Discontinued |
| Comparative Example 3 | 3.5 |
| Comparative Example 4 | 8.1 |

Assuming that Example 7 providing the smallest wear amount was a reference, the wear amounts of the Examples were 1 to 2.0 as shown in Table 2. On the other hand, in Comparative Examples 1 and 2, great chippings took place at cutting lengths of 12 m and 10 m respectively and therefore the processing was discontinued. Moreover, Comparative Examples 3 and 4 were worn greatly, specifically, their respective wear amounts were 3.5 times and 8.1 times as large as that of Example 7. Thus, it was confirmed that the cubic boron nitride polycrystal of each of the Examples was tougher than the cubic boron nitride polycrystals and cubic boron nitride sintered material of the Comparative Examples.

Heretofore, the embodiments and examples of the present invention have been illustrated, but it has been initially expected to appropriately combine the configurations of the embodiments and examples and modify them in various manners.

The embodiments and examples disclosed herein are illustrative and non-restrictive in any respect. The scope of the present invention is defined by the terms of the claims, rather than the embodiments and examples described above, and is intended to include any modifications within the scope and meaning equivalent to the terms of the claims.

The invention claimed is:
1. A cubic boron nitride polycrystal comprising cubic boron nitride,
the cubic boron nitride having an average grain size of not more than 150 nm, the cubic boron nitride polycrystal having a crack generation load of not less than 25 N in a breaking strength test in which an R200 μm diamond indenter is used to apply a load at a rate of 100 N/min.

2. The cubic boron nitride polycrystal according to claim 1, wherein the cubic boron nitride has an average grain size of not more than 100 nm.

3. The cubic boron nitride polycrystal according to claim 1, wherein the cubic boron nitride polycrystal includes not less than 0.01 volume % of wurtzite type boron nitride.

4. The cubic boron nitride polycrystal according to claim 1, wherein the cubic boron nitride polycrystal includes 0.01 to 0.5 volume % of compressed hexagonal boron nitride.

5. The cubic boron nitride polycrystal according to claim 1, wherein for X-ray diffraction in the cubic boron nitride, a ratio $I_{(220)}/I_{(111)}$ of X-ray diffraction intensity $I_{(220)}$ at a (220) plane to X-ray diffraction intensity $I_{(111)}$ at a (111) plane is not less than 0.1 and not more than 0.3.

6. A cutting tool comprising the cubic boron nitride polycrystal recited in claim 1.

7. A wear-resistant tool comprising the cubic boron nitride polycrystal recited in claim 1.

8. A grinding tool comprising the cubic boron nitride polycrystal recited in claim 1.

\* \* \* \* \*